United States Patent
Kuwata (10) Patent No.: US 7,698,500 B2
(45) Date of Patent: Apr. 13, 2010

(54) DISK ARRAY SYSTEM, HOST INTERFACE UNIT, CONTROL METHOD FOR DISK ARRAY SYSTEM, AND COMPUTER PROGRAM PRODUCT FOR DISK ARRAY SYSTEM

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 11/657,016

(22) Filed: Jan. 24, 2007

(65) Prior Publication Data

US 2007/0180189 A1 Aug. 2, 2007

(30) Foreign Application Priority Data

Feb. 1, 2006 (JP) .............................. 2006/024588

(51) Int. Cl.
*G06F 12/00* (2006.01)
(52) U.S. Cl. ....................................... 711/113; 711/114
(58) Field of Classification Search ................. 711/113, 711/114
See application file for complete search history.

(56) References Cited

U.S. PATENT DOCUMENTS

| | | | |
|---|---|---|---|
| 6,098,128 A * | 8/2000 | Velez-McCaskey et al. | ... 710/65 |
| 6,240,492 B1 * | 5/2001 | Foster et al. | ................. 711/149 |
| 7,249,221 B2 * | 7/2007 | Shimada | ..................... 711/130 |
| 7,343,451 B2 * | 3/2008 | Suzuki et al. | ............... 711/114 |
| 2002/0004885 A1 * | 1/2002 | Francis et al. | ............... 711/118 |
| 2004/0260965 A1 * | 12/2004 | Kelman | ........................ 714/2 |

FOREIGN PATENT DOCUMENTS

JP 2002-24085 1/2002

* cited by examiner

*Primary Examiner*—Christian P Chace
*Assistant Examiner*—Hashem Farrokh
(74) *Attorney, Agent, or Firm*—McGinn IP Law Group, PLLC (57) ABSTRACT

A disk array system includes a dedicated cache memory, a first host computer exclusively using the dedicated cache memory, data for a dedicated disk being written to or being read from the dedicated cache memory. The disk array system is connectable to the first host computer and to a second host computer.

11 Claims, 10 Drawing Sheets

CONVENTIONAL ART

DISK ARRAY SYSTEM, HOST INTERFACE UNIT, CONTROL METHOD FOR DISK ARRAY SYSTEM, AND COMPUTER PROGRAM PRODUCT FOR DISK ARRAY SYSTEM

BACKGROUND OF THE INVENTION

1. Field of the Invention

The present invention relates to a disk array system, a host interface unit, a control method for a disk array system, and a computer program product for a disk array system. More particularly, the present invention relates to a disk array system which is capable of installing an additional host computer or a host computer and a disk, reducing an occurrence of a bottleneck path, unaffected by the configuration.

2. Description of the Related Art

A disk array system including multiple hard disk devices is widely used as a large-scale storage device for a computer. One example of the disk array system includes a disk array system that is upwardly scalable by additionally providing a hard disk device or the like.

JP2002-24085A discloses an example of the above-mentioned disk array system. The disk array system includes a host adapter, an array disk, a disk adapter, and a cache memory. The host adapter, the disk adapter, and the cache memory are connected to a common bus in a removable manner. The disk array system is configured to be upwardly scalable by additionally providing a host adapter or the like.

Next, another conventional disk array system is explained.

Figure 9:
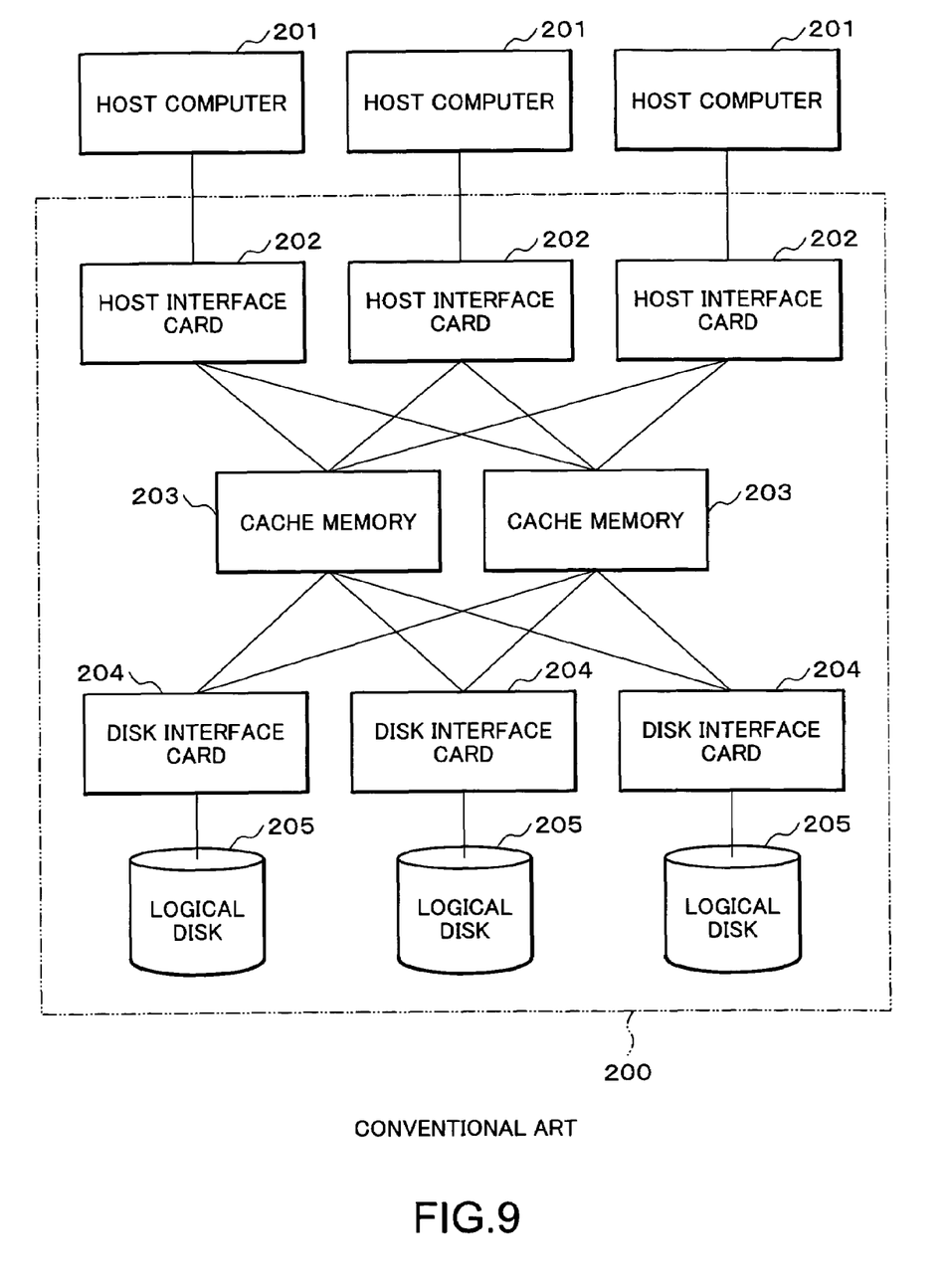
FIG. 9 is a block diagram showing a configuration of conventional large-scale disk array system 200.

FIG. 9 is a block diagram showing a configuration of conventional large-scale disk array system 200. In FIG. 9, host interface card 202 activates, in response to a command from host computer 201, a data transfer between host computer 201 and cache memory 203. In a case of a cache miss when a read command is received, host interface card 202 issues a read command to disk interface card 204.

Disk interface card 204 transfers, in response to the instruction from host interface card 202, data from logical disk 205 to cache memory 203. Also, when cache memory 203 has write data, disk interface card 204 activates a data transfer from cache memory 203 to logical disk 205.

Also, another conventional disk array system is explained.

Figure 10:
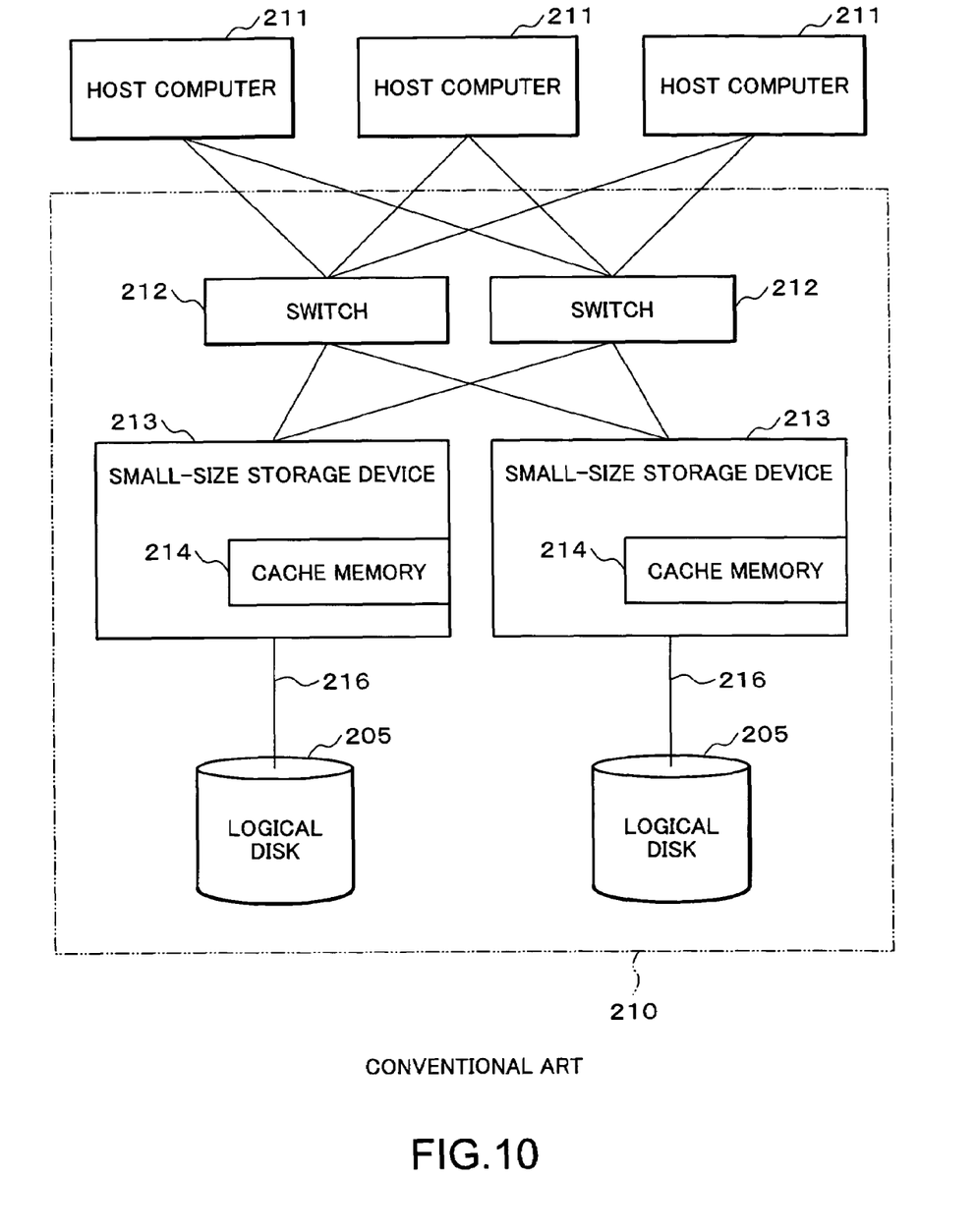
FIG. 10 is a block diagram showing a configuration of conventional storage subsystem 210.

FIG. 10 is a block diagram showing a configuration of conventional storage subsystem 210 structured by combining small-size storage devices 213. In FIG. 10, multiple small-size storage devices 213 are connected to multiple host computers 211 through switch 212, to thereby construct a storage area network. Small-size storage device 213 activates, in response to a command from host computer 211, a data transfer between host computer 211 and cache memory 213, and also activates a data transfer between cache memory 214 and logical disk 215 as needed.

SUMMARY OF THE INVENTION

However, a conventional disk array system may have exemplary problem described below involving.

Conventional large-scale disk array system 200 shown in FIG. 9 may have, for example, the following problems. Data transfers concentrate on cache memory 203 shared by multiple host interface cards 202. Accordingly, as the number of host interface cards 202 or of disk interface cards 204 increases, a greater load may be imposed on cache memory 203, which leads to a performance deterioration of the device. Therefore, there may be a limitation in the number of those cards which can be additionally provided. On the other hand, providing great many cache memories so as to prepare for possible installation in future in order to prevent the performance deterioration may lead to a high-cost scalability.

Conventional storage subsystem 210 shown in FIG. 10 may have, for example, the following problems. For example, additional installation of logical disks 215 may increase a load to be imposed on cache memory 214 in small-size storage device 213 because small-size storage devices 213 are independent of one another, which may lead to a performance deterioration.

Further, for example, additional installation of host computers 211 may also increase a load to be imposed on host interface bus 216 of small-scale storage device 213 which includes logical disk 215 which is used by host computer 211 additionally provided, because small-scale storage devices 213 are independent of one another. As a result, conventional storage subsystem 210 may suffer a performance deterioration.

In view of the above-mentioned circumstances, an exemplary feature of the present invention is to provide a disk array system or the like which may install an additional host computer or a host computer and a disk, reducing an occurrence of a bottleneck path, unaffected by the configuration.

The present invention provides a disk array system, including a dedicated cache memory, a first host computer exclusively using the dedicated cache memory, data for a dedicated disk being written to or being read from the dedicated cache memory. The disk array system is connectable to the first host computer and to a second host computer.

The present invention provides a host interface unit, including a dedicated cache memory, a first host computer exclusively using the dedicated cache memory, data for a dedicated disk being written to or being read from the dedicated cache memory. A disk array system includes the host interface unit and the disk array system is connectable to the first host computer and to a second host computer.

The present invention provides a control method for a disk array system, including receiving one of a write command and a read command for a target disk from a first host computer, executing one of the write command and the read command to a dedicated cache memory exclusively used by the first host computer, when the target disk includes the dedicated disk exclusively used by the first host computer, and executing one of the write command and the read command to a shared cache memory shared by the first host computer and the second host computer, when the target disk includes a shared disk shared by the first host computer and the second host computer.

The present invention provides a computer program product including a program for causing a control portion of a disk array system to perform the method described above.

An exemplary advantage of the present invention may be that a disk array system or the like may reduce occurrence of a bottleneck path, unaffected by the configuration, even when a host computer or a host computer and a disk are additionally installed.

The reason may be that a disk array system includes a dedicated cache memory, a first host computer exclusively using the dedicated cache memory, data for a dedicated disk being written to or being read from the dedicated cache memory. The disk array system is connectable to the first host computer and to a second host computer.

BRIEF DESCRIPTION OF THE DRAWINGS

Exemplary features and advantages of the present invention will become apparent from the following detailed description when taken with the accompanying drawings in which.

DETAILED DESCRIPTION OF THE PREFERRED EMBODIMENTS

Figure 1:
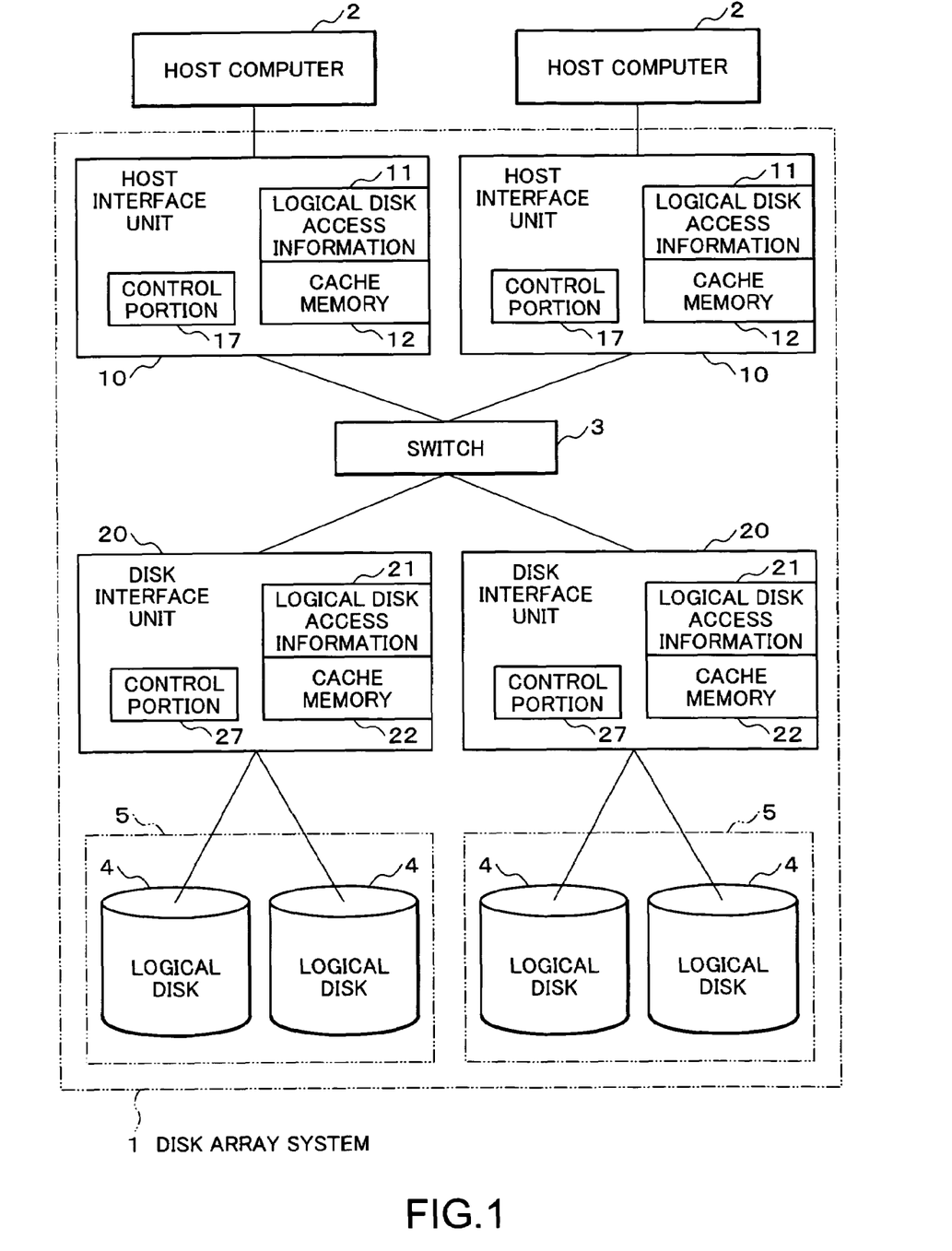
FIG. 1 is an exemplary schematic block diagram of exemplary disk array system 1.

Hereinafter, an explanation is given on a configuration and an operation of disk array system 1 according to an exemplary embodiment of the present invention with reference to the drawings. FIG. 1 is an exemplary schematic block diagram of exemplary disk array system 1 according to the present invention.

For example, disk array system 1 may include switch 3, disk unit 5, host interface unit 10, and disk interface unit 20.

Host interface unit 10 may be connected to host computer 2, and processes a command received from host computer 2. Host interface unit 10 also may include a control portion 17 and cache memory 12 (an example of a dedicated cache memory). Control portion 17 may control, for example, operations of a micro processing unit (MPU) and each pieces of hardware of disk array system 1. Further, host interface unit 10 may have logical disk access information 11 (an example of a disk access information storage portion) stored in a random access memory (RAM) (not shown).

Disk interface unit 20 connected to logical disk 4. Logical disks 4 may be substantially multiple disk drives configured as a redundant array of inexpensive disks (RAID). Also, disk interface unit 20 may have control portion 27 and cache memory 22 (an example of a shared cache memory), and may store logical disk access information 21. Multiple logical disks 4 connected to one disk interface unit 20, and multiple logical disks 4 may also be, included in disk unit 5.

Additional explanation is given on the shared cache memory (e.g., cache memory 22). The shared cache memory (e.g., cache memory 22) may be shared by a first host computer and a second host computer (multiple host computers 2). Upon receiving a data read command or a data write command to a shared disk (logical disk 4 accessed by another interface unit 10) to be described later, host interface unit 10 writes or reads out data, which is to be written in or read out from the shared disk, in/from the shared cache memory (e.g., cache memory 22).

Then, the data written in the shared cache memory (e.g., cache memory 22) is written back to the shared disk (logical disk 4 accessed by another interface unit 10) shared by the first host computer and the second host computer (multiple host computers 2)

In other words, host interface unit 10 is exclusively used by specific host computer 2. Upon receiving a data write command or a data read command with respect to a dedicated disk (e.g., logical disk 4 which is not accessed by any other host interface units 10) from specific host computer 2, host interface unit 10 writes or reads out data, which is to be written in or read out from the dedicated disk, in/from the dedicated cache memory (e.g., cache memory 12 on host interface unit 12).

To give a specific example, host interface unit 10 and disk interface unit 20 are connected with each other through switch 3 via a fibre channel.

Logical disk access information 11 and 21 may hold information which shows that which of host interface units 10 accesses which of logical disks 4.

Host interface unit 10 refers to logical access information 11 when performing input/output (I/O) control over logical disk 4. For example, when other host interface units 10 do not have access to target logical disk 4 of the I/O control (e.g., a dedicated disk), cache memory 12 on host interface unit 10 may be used. On the other hand, when other host interface units 10 also have access to target logical disk 4 (e.g., a shared disk), cache memory 12 on host interface unit 10 is not used. Cache memory 22 is used in place of cache memory 12, which may be on disk interface unit 20 to which target logical disk 4 is connected.

Logical disk access information 21 stored in disk interface unit 20 may have the same contents as those stored in host interface unit 10. For example, when host interface unit 10 is turned off for maintenance, logical disk access information 21 may be transferred from disk interface unit 20 to host interface unit 10, to thereby restore the contents of the data.

Also, control portion 27 may have a function of monitoring how data is stored in cache memory 22 of disk interface unit 20. When logical disk access information 21 and the state of the data stored in cache memory 22 meet certain conditions, a data transfer from disk interface unit 20 to host interface unit 10 may be omitted.

Figure 8:
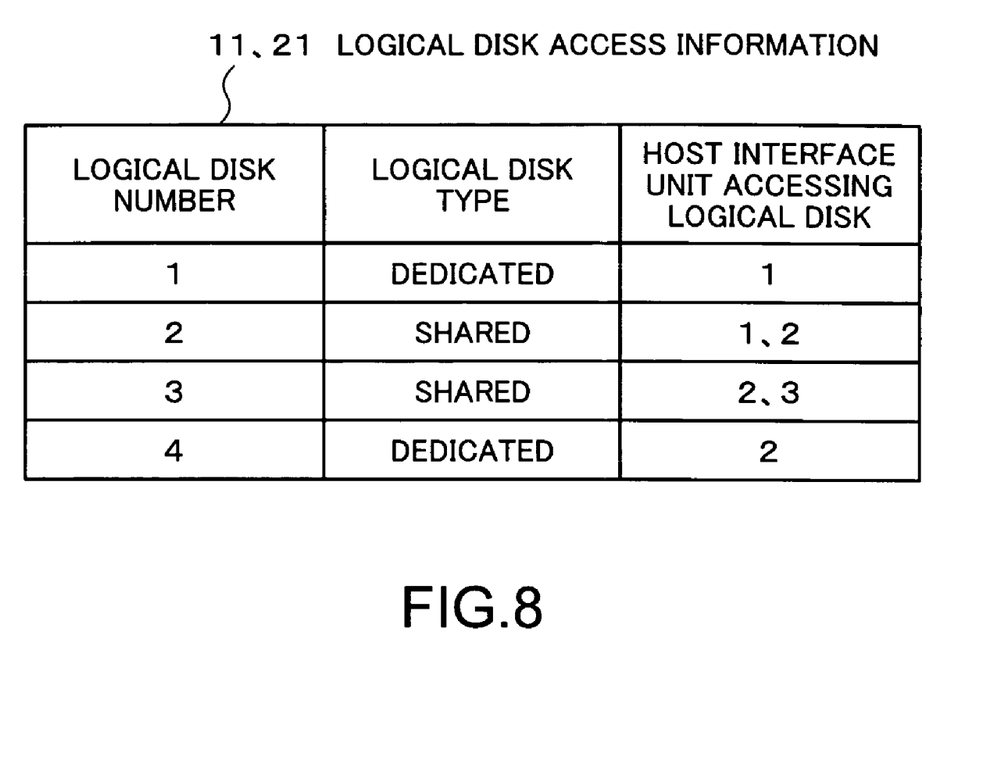
FIG. 8 shows an example of data included in exemplary logical disk access information 11 and 21.

FIG. 8 shows an example of data included in exemplary logical disk access information 11 and 21. Logical disk access information 11 and 21 indicates whether the target disk of a data write command or of a data read command is a dedicated disk or a shared disk. Host interface unit 10 refers to logical disk access information 11 to thereby determine whether the data relates to a dedicated disk or to a shared disk.

To give a specific example, logical disk access information 11 and 21 includes information for identifying logical disk 4. The information may include, for example, a unique number assigned in advance to logical disk 4, information indicating the type of logical disk 4, information for identifying host interface unit 10 accessing logical disk 4, that is, a unique number assigned in advance to, for example, host interface unit 10.

Data shown in FIG. 8 is obtained when disk array system 1 includes four logical disks and three host interface units. The first row shown in the drawing indicates that the logical disk assigned an identification number "1" is a dedicated disk and is accessed by the host interface unit assigned an identification number "1". The second row shown in the drawing indicates that the logical disk assigned an identification number "2" is a shared disk and is accessed by both the host interface unit assigned an identification number "1" and the host interface unit assigned an identification number "2". The same goes for the third row and the fourth row.

For example, logical disk access information 11 and 21 may be stored in advance in a RAM of host interface unit 10 or of disk interface unit 20. Logical disk access information 11 and 21 may be updated when disk array system 1 is changed in configuration due to, for example, host interface unit 10 additionally provided. The update may be manually performed. Alternatively, it is also possible to provide control portion 17 or control portion 27 with a function of detecting a state of access from host computer 2 to logical disk 4, and control portion 17 or control portion 27 may automatically update the information in accordance to the state of access thus detected.

Figure 2:
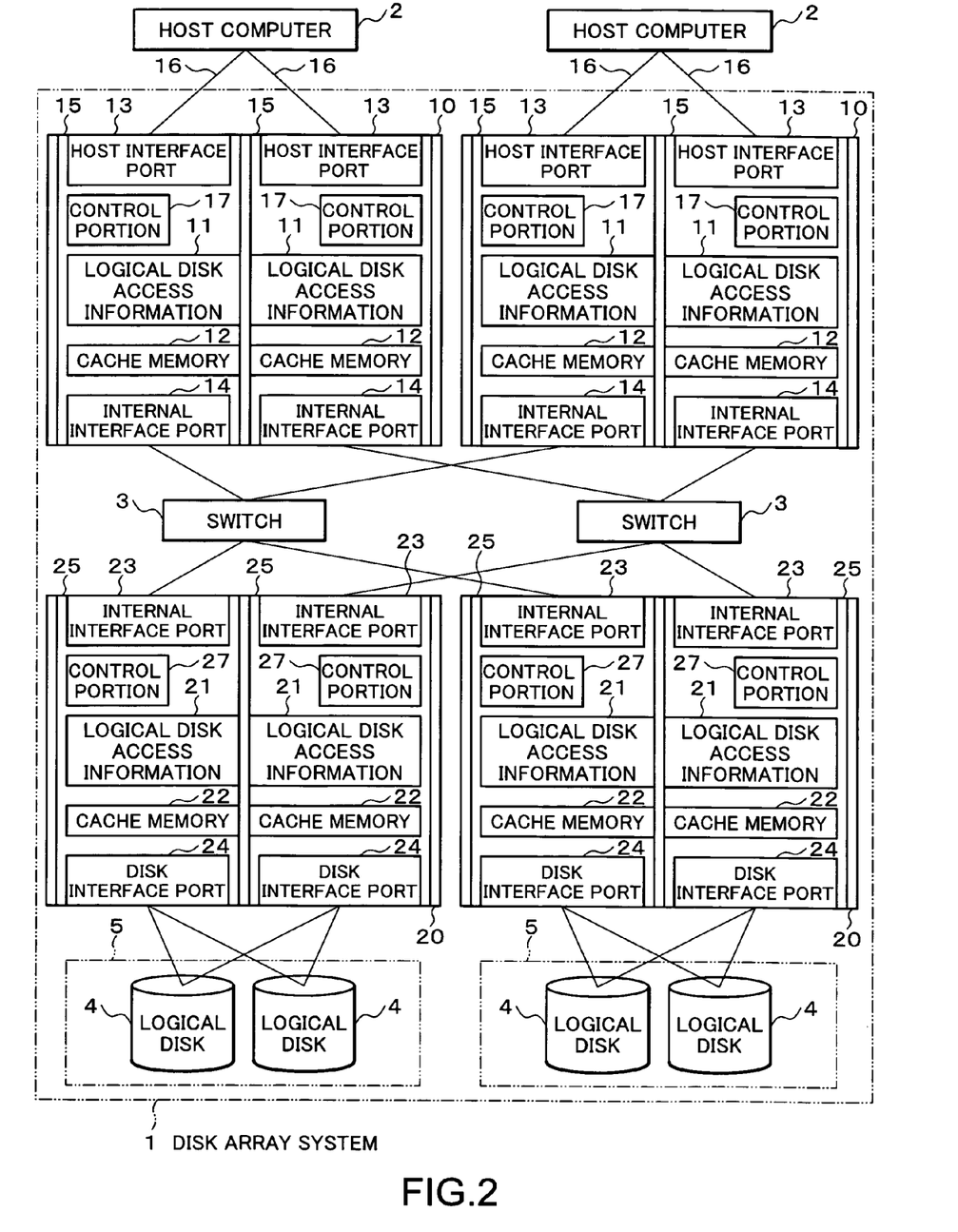
FIG. 2 is an exemplary detailed block diagram of exemplary disk array system 1.

FIG. 2 is a detailed exemplary block diagram of exemplary disk array system 1 according to the present invention. FIG. 2 is a block diagram also showing disk array system 1, in which configurations of host interface unit 10 and disk interface unit 20 are shown in more detail as compared with those of FIG. 1.

For example, host interface unit 10 may include two host interface cards 15, to thereby make the command processing function redundant. Host interface card 15 may include host interface port 13, cache memory 12, and internal interface port 14, and stores logical disk access information 11.

Host interface port 13 is connected to host computer 2. Connecting paths 16, which connect host computer 2 and host interface port 13 with each other, are made redundant. Accordingly, even when a failure occurs in one of connecting paths 16, it may be possible to continue the operation. Host computer 2 sends a command to host interface unit 10 through one of paths 16, which is predetermined as a connecting path for normal use. If host computer 2 fails in an attempt to send the command, host computer 2 makes a retry to send the command by using the other path 16.

Cache memory 12 stores write data received from host computer 2 and read data to be sent to host computer 2.

Internal interface port 14 is connected to internal interface port 23 of disk interface unit 20 through switch 3.

For example, disk interface unit 20 may include two disk interface cards 25, to thereby make each function redundant. Disk interface card 25 may include internal interface port 23, cache memory 22, and disk interface port 24, and stores logical disk access information 21.

Internal interface port 23 connected to internal interface port 14 of host interface unit 10 through switch 3. Cache memory 22 stores write data received from host interface unit 10 and read data to be sent to host interface unit 10. Disk interface port 24 is connected to disk unit 5. Disk unit 5 includes multiple logical disks 4. Multiple logical disks 4 are substantially multiple disk drives configured as a RAID.

Next, an operation of disk array system 1 is explained.

Figure 3:
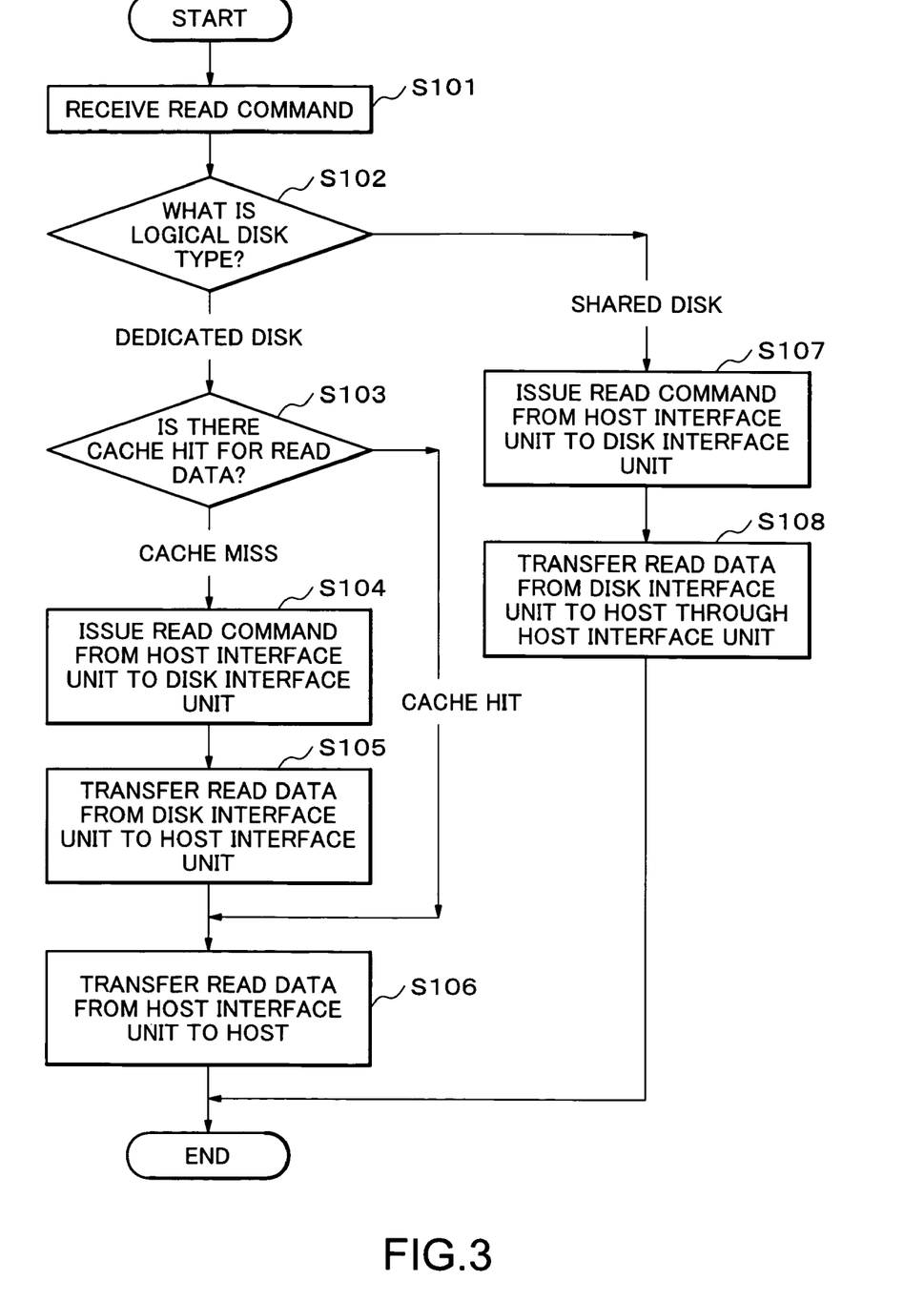
FIG. 3 is an exemplary flowchart showing an exemplary operation of exemplary disk array system 1 upon receiving a read command from host computer 2.

FIG. 3 is an exemplary flowchart showing an exemplary operation of exemplary disk array system 1 upon receiving a read command from host computer 2.

Upon host interface unit 10 receiving a read command from host computer 2 (S101), control portion 17 of host interface card 15, which has received the command, refers to logical disk access information 11, to thereby determine whether a target logical disk from which the data is to be read is a dedicated disk or a shared disk (S102).

When the target logical disk is a dedicated disk, control portion 17 determines whether there is a cash hit in the read cache on cache memory 12 (S103). In a case of a cash miss, host interface unit 10 issues a read command to disk interface unit 20 (S104), and disk interface unit 20 transfers the read data to cache memory 12 on host interface unit 10 (S105).

Host interface unit 10 reads out the read data from cache memory 12, and transfers the data to host computer 2 (S106).

When it is determined in S103 that there is a cache hit, host interface unit 10 immediately reads out the read data from cache memory 12, and transfers the read data to host computer 2 (S106).

In other words, disk array system 1 capable of connecting to a first host computer and to a second host computer (e.g., multiple host computers 2) includes a dedicated cache memory which is exclusively used by the first host computer (e.g., cache memory 12). Then, data is read out from the dedicated cache memory (e.g., cache memory 12) when a command issued by the first host computer (e.g., specific host computer 2) is a read command of data in the dedicated disk (e.g., when target logical disk 4 is a dedicated disk).

When it is determined in S102 that the target logical disk is a shared disk, host interface unit 10 issues a read command to disk interface unit 20 (S107). Upon receiving the command, disk interface unit 20 reads out data from cache memory 22 when the read data is included in cache memory 22. If the read data is not included in cache memory 22, disk interface unit 20 reads out data from logical disk 4. Then, disk interface unit 20 sends the read data to host interface unit 10 through switch 3. Host interface unit 10 transfers the read data thus received to host computer 2 (S108).

That is, disk interface unit 20 reads out data from the dedicated disk when a data read command to read out data from the dedicated disk is received from host interface unit 10.

Figure 4:
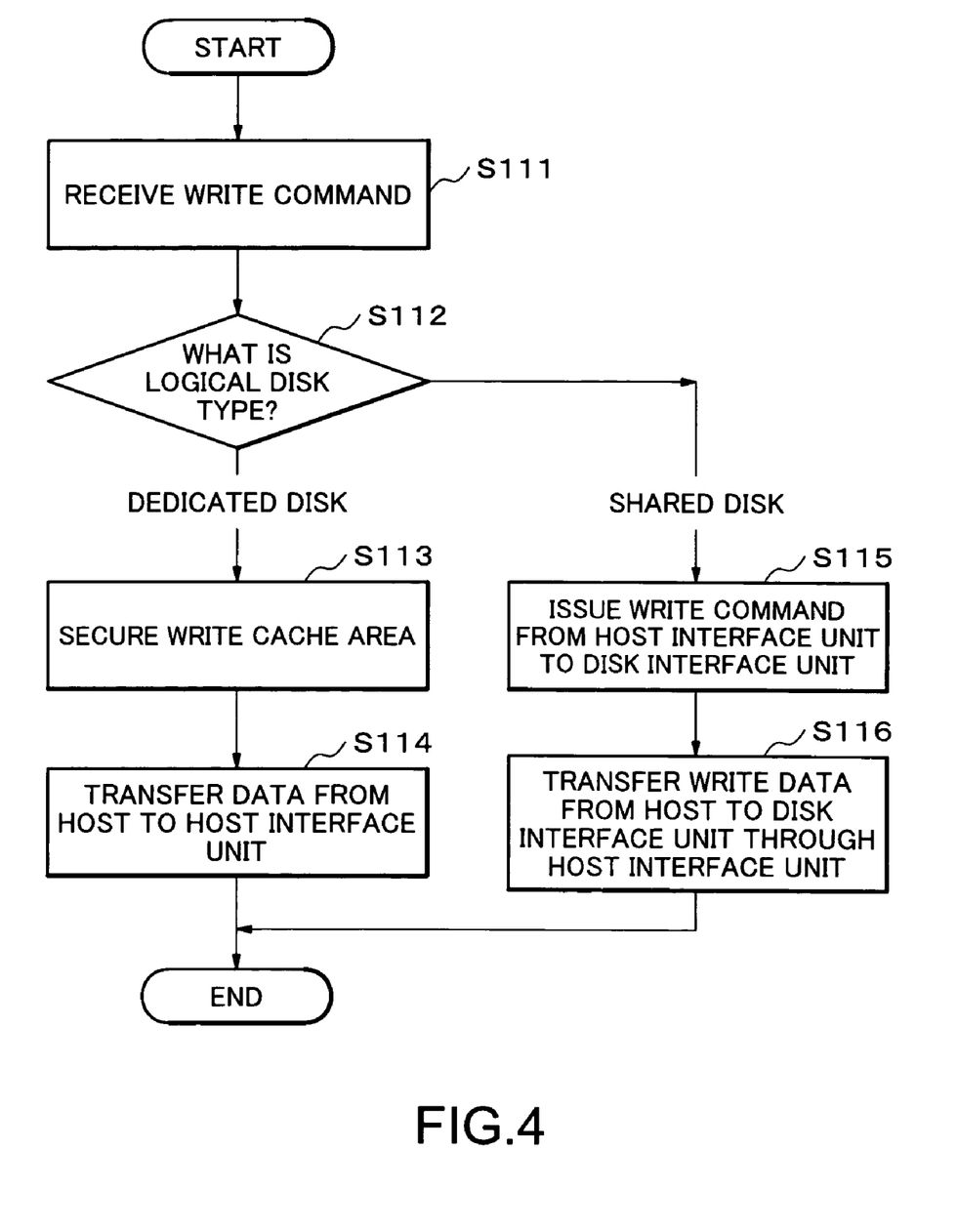
FIG. 4 is an exemplary flowchart showing an exemplary operation of exemplary disk array system 1 upon receiving a write command from host computer 2.

FIG. 4 is an exemplary flowchart showing an exemplary operation of exemplary disk array system 1 upon receiving a write command from host computer 2.

Upon host interface unit 10 receiving a write command from host computer 2 (S111), control portion 17 refers to logical disk access information 11, to thereby determine whether a target logical disk in which the data is to be written is a dedicated disk or a shared disk (S112).

When the target logical disk is a dedicated disk, control portion 17 secures a write cache area on cache memory 12 so that the data to be received from host computer 2 can be stored into the area (S113). Then, control portion 17 stores the data received from host computer 12 into the write cache area thus secured (S114).

In other words, disk array system 1 capable of connecting to a first host computer and to a second host computer (e.g., multiple host computers 2) includes a dedicated cache memory which is exclusively used by the first host computer (e.g., cache memory 12). Then, data is written into the dedicated cache memory (e.g., cache memory 12) when a command issued by the first host computer (e.g., specific host computer 2) is a write command of data in the dedicated disk (e.g., when the target logical disk is a dedicated disk).

When it is determined in S112 that the target logical disk is a shared disk, host interface unit 10 issues a write command to disk interface unit 20 (S115). Disk interface unit 20 stores the write data transferred from host interface unit 10 into cache memory 22 (S116).

That is, disk interface unit 20 writes data into the shared cache when a data write command to write data into the shared disk is received from host interface unit 10.

Figure 5:
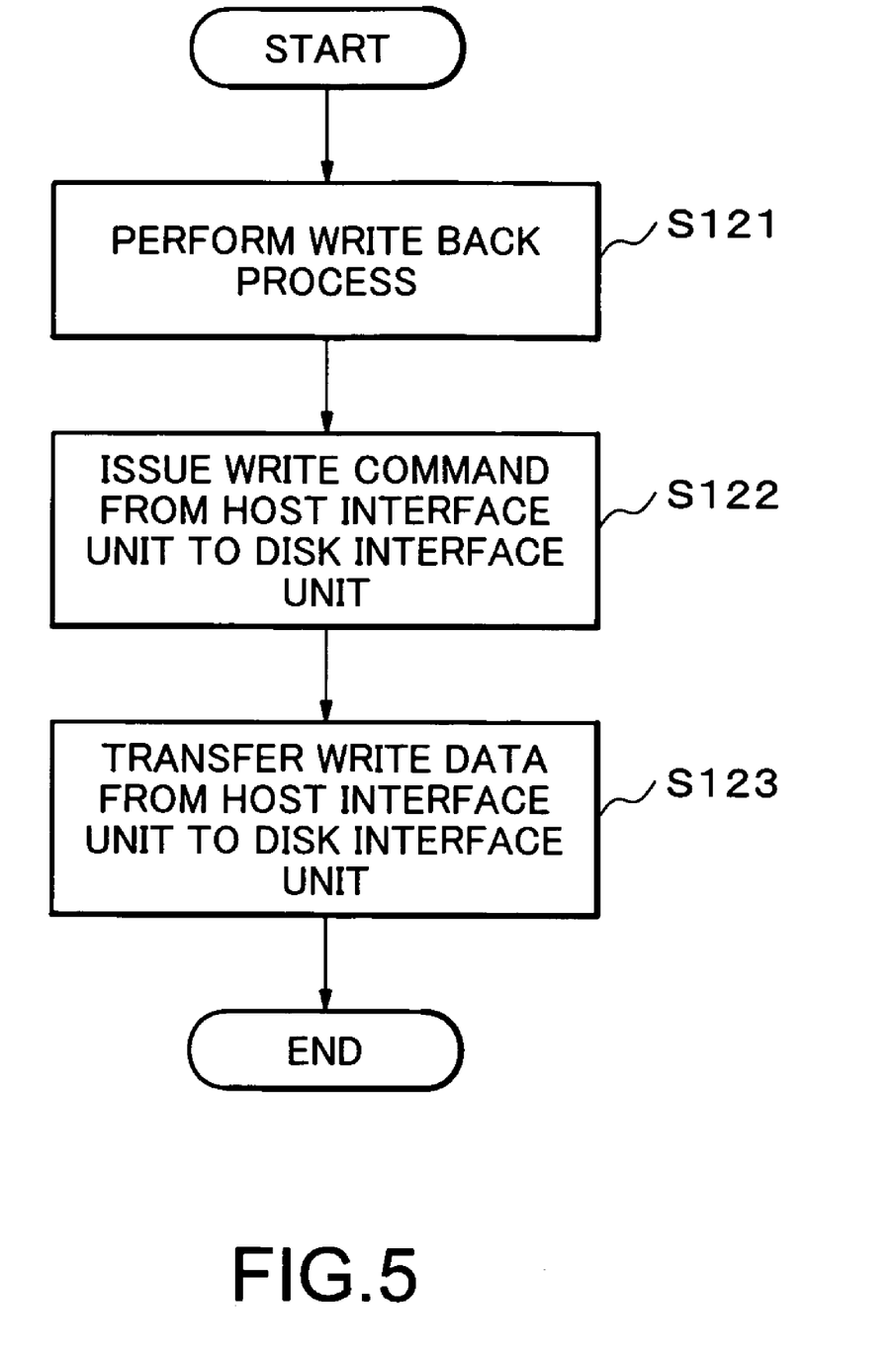
FIG. 5 is an exemplary flowchart showing an exemplary write-back operation performed by exemplary disk array system 1.

FIG. 5 is an exemplary flowchart showing an exemplary write-back operation performed by exemplary disk array system 1. More specifically, FIG. 5 is an example of a flowchart showing an operation of exemplary disk array system 1 to write back write data accumulated on exemplary cache memory 12 of exemplary host interface unit 10.

Upon starting a write back process (S121), host interface unit 10 issues a write command to disk interface unit 20 (S122). Write data is transferred from cache memory 12 of host interface unit 10 to disk interface unit 20 (S123).

In other words, write data, which is written into the dedicated cache memory (e.g., cache memory 12) and relates to the dedicated disk, is written back to the dedicated disk (e.g., logical disk 4) through disk interface unit 20.

Figure 6:
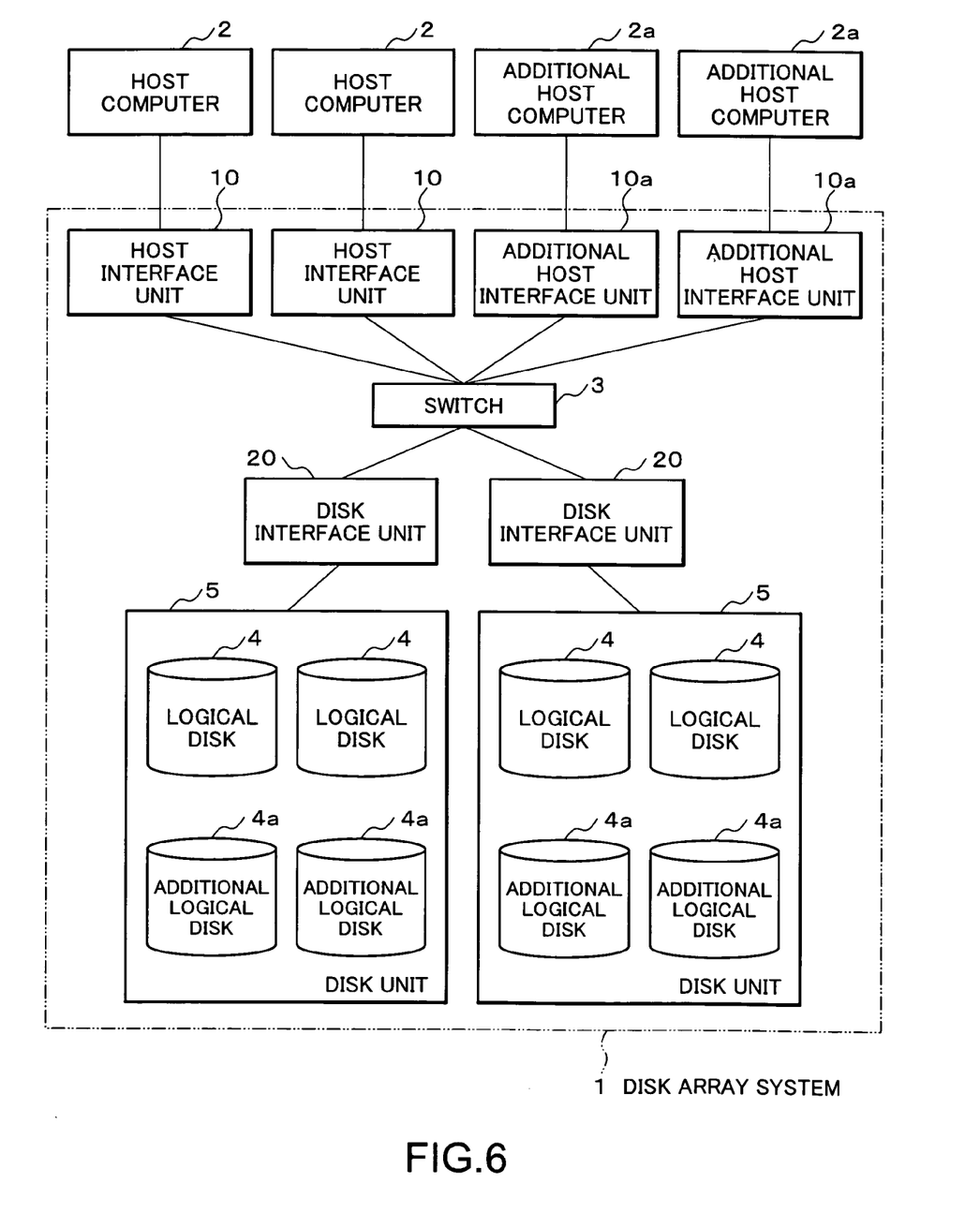
FIG. 6 is an exemplary block diagram showing a state where exemplary host interface units 10a and exemplary logical disks 4a are additionally provided to exemplary disk array system 1.

FIG. 6 is an exemplary block diagram showing a state where exemplary host interface units 10a and exemplary logical disks 4a are additionally provided to exemplary disk array system 1. More specifically, FIG. 6 shows a structural example where two additional exemplary host interface units 10a are additionally provided to disk array system 1 of FIG. 1, each of exemplary host interface units 10a has exemplary additional host computers 2a connected thereto, and further two exemplary disk units 5 each are additionally provided with, for example, two exemplary logical disk drives 4a.

In this exemplary case, the amount of data exchanged between host computers 2, 2a and logical disks 4, 4a increases as compared with the case of FIG. 1. Under the circumstances, if the conventional method is adopted in which the cache memory is shared by all the host interface units as shown in, for example, FIG. 9, the use of a cache memory is increased, which leads to a higher probability of occurrence of a cache miss. As a result, the disk array system as a whole may suffer degradation in performance.

However, in disk array system 1, host interface units 10 and 10a each are provided with cache memory 12 which serves as a dedicated memory. In this exemplary case, if target logical disks 4 and 4a of data read and data write are dedicate disks, data is written in and read out from cache memory 12 which is a dedicated cache memory, rather than from a shared cache memory. Therefore, a high cache hit ratio may be maintained, irrespective of a change in configuration due to the installation of additional host interface unit 10a and logical disk 4a.

It should be noted that in the case of additionally providing host computer 2 which uses disk array system 1, host interface unit 10 may also be additionally provided in general. For example, host interface unit 10a which is additionally provided includes cache memory 12. Therefore the installation of additional host computer 2 may not increase the load imposed on cache memory. Accordingly, it may be possible to prevent the performance degradation.

When a target disk of a command received from host computer 2 is a shared disk, control portion 17 of host interface unit 10 uses cache memory 22 of disk interface unit 20 rather than cache memory 12 of host interface unit 10. Therefore, it may be possible to guarantee the validity of data held in the cache memory even if a shared disk exists.

Control portion 17 of host interface unit 10 determines the type of logical disk 4 which is a target of the command, referring to logical disk access information 11 stored in host interface unit 10. Accordingly, control portion 17 may be capable of reliably determining the type of the logical disk even when both the shared disk and the dedicated disk exist.

Next, another operation of disk array system 1 is explained. In this example, the operation is further devised to cope with a failure occurring in host interface unit 10.

Figure 7:
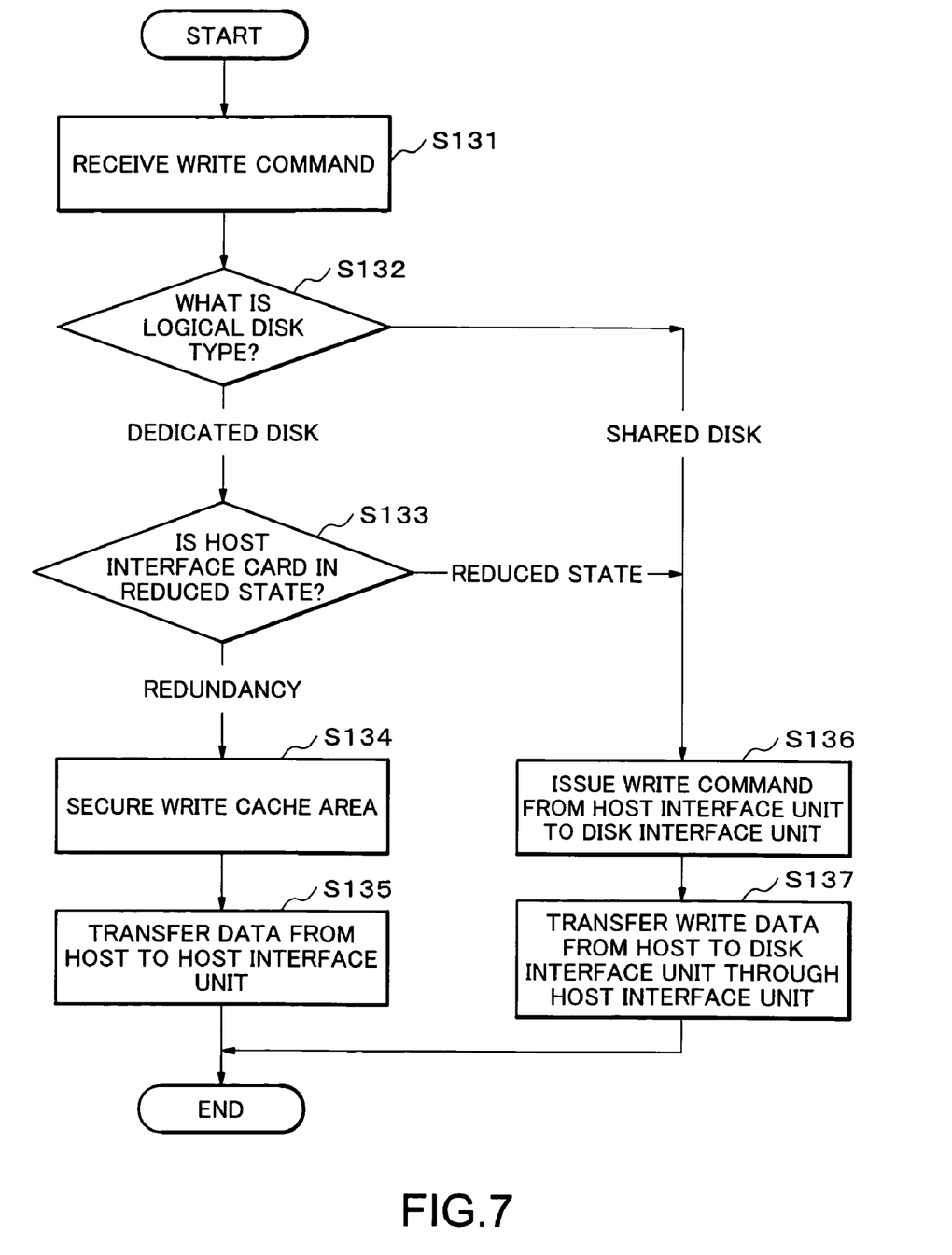
FIG. 7 is an exemplary flowchart showing another exemplary operation of exemplary disk array system 1 upon receiving a write command from host computer 2.

FIG. 7 is an exemplary flowchart showing another exemplary operation of exemplary disk array system 1 upon receiving a write command from host computer 2.

Host interface unit 10 executes a write command to a dedicated cache memory only when all multiple host interface cards 15 are in normal operation. In other words, when one of multiple host interface cards 10 each including a dedicated cache memory (e.g., cache memory 12) is not functioning normally, host interface unit 10 receiving the command which is a write command executes the write command to the shared cache memory (e.g., cache memory 22) even if the target logical disk of data write is a dedicated disk.

Specifically, upon host interface card 10 receiving a write command from host computer 2 (S131), control portion 17 judges whether target logical disk 4 of data write is a dedicated disk or a shared disk (S132).

When target logical disk 4 of data write is a dedicated disk, control portion 17 judges whether host interface card 15 is in a reduced state, while processing a write command (S133). Here, the term "reduced state" refers to a state where one of two host interface cards 15 in host interface unit 10 is not operating normally. The judgment is made by control portion 17 through, for example, determination as to presence or absence of a signal exchanged between two host interface cards 15 for informing that two host interface cards 15 are operating normally.

The write data may not be made redundant, when host interface card 15 is in a reduced state due to a failure. Accordingly, if a fast write operation is performed, the write data may be lost if a failure should occur in another host interface card 15. Therefore, in this operational example, a fast write is performed (S134 and S135) when it is determined in S133 that host interface cards 15 are made redundant.

When host interface cards 15 are not made redundant, data is directly transferred to disk interface unit 20 (S136 and S137) as in the case of the operation regarding a shared disk, in which cache memory 12 on host interface card 15 is not used as a write cache. Even in this case, cache memory 22 of disk interface unit 20 may be used as a write cache. Therefore a cache hit performance may be secured to a certain degree, even though cache performance is deteriorated compared with the case where no failure is occurring in host interface card 15.

When disk array system 1 is operated in the manner as described above, cache memory 12 of host interface card 15 is not used as a write cache if host interface card 15 lacks redundancy due to a failure. Therefore, even when some of host interface cards 15 are not in normal operation, the validity of write data can be guaranteed. Also, even in this case, cache memory 22 of disk interface card 25 is used as a write cache, and therefore disk array system 1 suffers minimum degradation in performance.

The present invention can be implemented as a program to be executed by a computer installed in host interface unit 10. For example, control portion 17 and control portion 27 each execute a program stored in a program storage medium, to thereby execute a process shown in FIGS. 3, 5, and 7.

The disk array system according to the present invention may produce the following advantages.

The disk array system according to the present invention includes, for example, a dedicated cache memory. The host interface unit may use the dedicated cache memory upon receiving a data read command or a data write command with respect to a dedicated disk. Therefore, it may be possible to prevent the performance degradation due to the increase of a load imposed on the cache memory caused by the installation of an additional host interface unit or an additional logical disk.

The reason may be that, for example, the disk array system according to the present invention includes a dedicated cache memory exclusively used by a specific host interface unit, and the control portion of a disk interface unit executes data read or data write with respect to the dedicated cache memory when the host interface unit receives a read command or write command from a host computer for the dedicated disk.

Also, according to the present invention, it may be possible to prevent the performance degradation from being caused by, for example, the increase of the load imposed on the cache memory due to the installation of additional host computer.

The reason may be that the dedicated cache memory is installed in the host interface unit. That is, in the case of additionally providing the host computer which uses the disk array system, the host interface unit is also additionally provided in general. The host interface unit to be additionally provided includes a dedicated cache memory.

Also, according to the present invention, the dedicated memory may not be used, for example, for data read or data write with respect to the shared disk. Therefore, the validity of data held in the cache memory may be guaranteed even when a shared disk exists.

The reason may be that, in the above-mentioned disk array system, a shared cache memory used by multiple host interface units is provided on the disk interface unit. The control portion executes a command for the shared disk, when a host interface unit receives a write command or a read command for the shared disk which is a logical disk shared by the host interface unit and other host interface units, from a host computer.

Also, according to the present invention, even when, for example, a host interface unit is in a reduced state, it may be possible to guarantee the validity of data held by a cache memory.

The reason may be that, in the above-mentioned disk array system, the host interface unit includes multiple host interface cards each including a dedicated cache memory, and the control portion executes a write command for the dedicated cache memory only when all the multiple host interface cards are in normal operation. That is, when apart of multiple host interface cards included in the host interface unit is not in normal operation, which means that the host interface unit is at least operating but in a reduced state where redundancy is lost, data write may not be performed with respect to the dedicated cache memory.

Also, according to the present invention, the control portion may be capable of reliably determining the type of disk even when both a shared disk and a dedicated disk exist.

The reason may be that the above-mentioned disk array system includes a disk access information storage portion for storing disk access information for each host interface unit, the disk access information indicating whether the logical disk is a dedicated disk or a shared disk. In addition, the control portion refers to the disk access information to thereby determine whether the target logical disk is a dedicated disk or a shared disk.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

This application is based on Japanese Patent Application No. JP 2006-024588 filed on Feb. 1, 2006, and including a specification, claims, drawings and summary. The disclosure of the above Japanese Patent Application is incorporated herein by reference in its entirety.

What is claimed is:

1. A disk array system, comprising:
a dedicated cache memory exclusively used by a first host computer;
a shared cache memory shared by said first host computer and a second host computer; and
a disk access information that indicates which of a dedicated disk and a shared disk is a target disk of a command for writing data to or reading data from,
wherein:
said disk array system is connectable to said first host computer and to said second host computer;
when said command for writing data to or reading data from said target disk is received from said first computer, determines whether said target disk is said dedicated disk or said shared disk, by referring to said disk access information;
when said target disk is said dedicated disk, writes the data to or reads the data from said dedicated cache memory; and
when said target disk is said shared disk, writes the data to or reads the data from said shared cache memory.

2. The disk array system according to claim 1, further comprising:
said dedicated disk exclusively used by said first host computer,
wherein data for said dedicated disk, that has been written in said dedicated cache memory is written to the dedicated disk.

3. The disk array system according to claim 2, further comprising:
a host interface unit that includes said dedicated cache memory,
wherein:
said host interface unit is exclusively used by said first host computer;
when said host interface unit receives said command for writing data to or reading data from said target disk from said first computer, said host interface unit determines whether said target disk is said dedicated disk or said shared disk, by referring to said disk access information; and
when said target disk is said dedicated disk, said host interface unit writes the data to or reads the data from said dedicated cache memory.

4. The disk array system according to claim 3,
wherein, when said target disk is said shared disk, said host interface unit writes the data to or reads the data from shared cache memory.

5. The disk array system according to claim 4, further comprising:
said shared disk shared by said first host computer and said second host computer.

6. The disk array system according to claim 5, further comprising:
a disk interface unit that includes said shared cache memory, wherein:
when said disk interface unit receives said command for writing data to or reading data from said shared disk, from said host interface unit, said disk interface unit writes the data to or reads the data from said shared disk; and
when said disk interface unit receives said command for writing data to or reading data from said dedicated disk, from said host interface unit, said disk interface unit writes the data to or reads the data from said dedicated disk.

7. The disk array system according to claim 3, wherein:
said host interface unit includes host interface cards, each of said host interface cards including said dedicated cache memory; and
said host interface unit writes data to said dedicated cache memory only when all said host interface cards are in normal operation.

8. A host interface unit, comprising:
a dedicated cache memory exclusively used by a first host computer; and
a disk access information that indicates which of a dedicated disk exclusively used by said first host computer and a shared disk shared by said first host computer and a second host computer is a target disk of a command for writing data to or reading data from,
wherein:
a disk array system includes said host interface unit and said disk array system is connectable to said first host computer and to said second host computer;
when said command for writing data to or reading data from said target disk is received from said first computer, said host interface unit determines whether said target disk is said dedicated disk or said shared disk, by referring to said disk access information;
when said target disk is said dedicated disk, said host interface unit writes the data to or reads the data from said dedicated cache memory; and
when said target disk is said shared disk, said host interface unit writes the data to or reads the data from a shared cache memory shared by said first host computer and said second host computer.

9. A control method for a disk array system, comprising:
receiving one of a write command and a read command for a target disk from a first host computer;
determining whether said target disk is a dedicated disk exclusively used by said first host computer or a shared disk shared by said first host computer and a second host computer, by referring to a disk access information that indicates which of said dedicated disk and said shared disk is a target disk of said write command or said read command;
executing one of said write command and said read command to a dedicated cache memory exclusively used by said first host computer, when said target disk is said dedicated disk; and
executing one of said write command and said read command to a shared cache memory shared by said first host computer and said second host computer, when said target disk is said shared disk.

10. The control method for a disk array system according to claim 9, further comprising:
receiving said write command for said target disk from said first host computer; and
executing said write command to said shared cache memory, when one of host interface cards, each of said host interface cards including said dedicated cache memory, is out of normal operation, even when said target disk is said dedicated disk.

11. A computer storage medium including a program for causing a control portion of a disk array system to perform the method of claim 9.

* * * * *